3,526,552
METAL TREATING
Clark P. Church and Barry I. Pletcher, Beaver Falls, Pa., assignors to The Babcock & Wilcox Company, New York, N.Y., a corporation of New Jersey
No Drawing. Filed June 2, 1966, Ser. No. 554,682
Int. Cl. C21d 1/70, 1/72
U.S. Cl. 148—14                                    10 Claims

ABSTRACT OF THE DISCLOSURE

A method of treating the surface of an iron based metal article during heat treatment wherein the finished article is covered with scale interspersed with particles of a coating material which facilitates scale removal during subsequent pickling. The coating material consists of sodium chloride, barium chloride or calcium chloride applied to the article prior to or during heat treatment of the article.

---

This invention relates to metal treating, and more particularly to a method of treating the surface of a metal article so that the scale which is formed during annealing of the article may be subsequently removed with ease.

The present invention is applicable to the treatment of articles made of ferrous metals, and also to some non-ferrous metals such as Inconel and metals wherein the predominant alloying metal is nickel, cobalt, molybdenum, etc., and the iron content is as low as 10 to 20%.

After metal articles such as tubes are formed they are annealed at elevated temperature to place the metal in suitable metallurgical condition for fabrication and then pickled in an acid bath to provide a scale-free finish. The scale, which forms during annealing, is usually a metal oxide which results from the free oxygen in air combining with the metal.

Scale is undesirable on the surface of the article, especially if the article is to be machined, because it is an abrasive which is damaging to cutting tools. Furthermore, if scale covers the entire surface of the article it detracts from its appearance and interferes with inspection for defects in the material. In addition, the scale may be reactive in certain chemical environments. Thus, it is highly desirable to supply annealed metal articles in scale-free condition.

Pickling is a step employed to remove scale by immersing the articles in an acid bath, usually of 7 to 12% sulfuric acid or 10 to 20% hydrochloric acid, preferably maintained at a temperature of 140° to 180° F.

Past attempts to eliminate or reduce pickling time by minimizing scale formation have not been entirely successful. The present invention copes with the problem quite differently by coating the article with one or more salts from the group comprising sodium chloride, barium chloride or calcium chloride in order to render the scale which is formed during annealing more readily removed during the subsequent picking operation.

The problem of scale removal has been found to be much more difficult when articles are annealed in a furnace equipped with tempered flame burners which are supplied with air at a constant rate and with fuel gas at an adjustably selected rate, as compared with a conventional burner which operates at a substantially fixed ratio of fuel gas and air over its load range. While the tempered flame burner provides the advantage of better air circulation and faster cooling of the furnace upon completion of the annealing phase, this is partly offset by the effect of excess oxygen in the furnace atmosphere during annealing, since the excess oxygen reacts to produce a scale which is unusually difficult to remove by pickling.

In carrying out the invention, the articles to be annealed are coated with one or more materials from the group consisting of sodium chloride, barium chloride and calcium chloride, alone, in solution, or in a slurry such as flour and water. The scale formed on articles during annealing when thus coated is characterized as friable since it contains large, uniformly distributed quantities of the coating material in crystalline form. Scale of such character is more easily removed because the crystals readily dissolve when the article is immersed in the acid pickling bath, thus providing many avenues of entry to the metal surface beneath the scale and permitting the pickling solution to hasten scale removal. It has been found, for example, that scale can be completely removed from a steel tube in a pickling bath in 50 to 75 minutes when it is coated with salt according to the invention prior to annealing, as compared with a pickling period of 4 to 6 hours to attain comparable results with a similar tube not so treated. In both instances an annealing furnace firing tempered flame burners was employed.

Optionally, the annealed articles may be quenched, as in water, after annealing in order to permit immediate handling of the articles before pickling.

The articles may be coated with the mentioned chemical salt materials in any one of several ways. They may be painted with a suitable slurry which includes the coating material and any inert material, such as flour and water, or the articles can be immersed in a saturated solution of the coating material with the solution preferably being at a temperature of 140° to 180° F., and then either air dried or moved directly into the annealing furnace. Alternatively, trays of the coating salt may be placed in the furnace together with the articles so that furnace heat will cause sublimation, as by melting and/or vaporization, of the salt, followed by entrainment and deposition of the salt or one of its derivatives on the article. As another alternative, the coating salt can be vaporized or aerated outside the furnace chamber and then introduced, as by a gaseous medium, to the furnace chamber for deposition on the articles.

The coated article is annealed in a furnace chamber by raising its metal temperature to within or near the critical range, usually without atmosphere control, during which time the easily removable scale is formed; and then the article is cooled and subsequently pickled to remove the scale.

What is claimed is:
1. A method of treating an iron based metal article, comprising the steps of:
   coating said article with at least one material of the group consisting of sodium chloride, barium chloride, and calcium chloride,
   annealing said article by heating it to a temperature in or near the critical temperature range of the metal without atmospheric control,
   forming an oxide scale on the surface of said article during said annealing, which scale comprises an oxide of the metal from which the article is made and distributed particles of the coating material, and
   pickling said article with an acid bath to remove said scale, where said distributed particles of the coating material enhances the ability of said acid to remove said oxide scale from the article.
2. The method according to claim 1 wherein the coating is done by placing the coating material in an annealing furnace with said article and applying heat to said furnace to promote vaporization of the coating material and material deposition on said article.
3. The method according to claim 1 wherein the coat- ing step is done by mixing said coating material in a liquid vehicle and applying the mixture to the article.

4. The method according to claim 1 wherein the coating step is performed by immersing the article in a saturated solution of coating material.

5. The method according to claim 1 wherein said coating step is performed by sublimating said coating material and conveying the same by a gas to said article for deposition thereon.

6. The method according to claim 1 wherein said article is cooled at a controlled rate between said annealing step and said pickling step.

7. The method according to claim 1 including the step of quenching said article in water before pickling.

8. The method according to claim 1 wherein pickling is performed by immersing the article in a sulfuric acid solution.

9. The method according to claim 1 wherein pickling is performed by immersing the article in a hydrochloric acid solution.

10. The method according to claim 4 wherein said acid bath and said saturated solution of coating material are both maintained at a temperature of between 140° and 180° F.

References Cited

UNITED STATES PATENTS

| 1,085,768 | 2/1914 | Thompson et al. | 148—14 |
| 2,045,392 | 6/1936 | Kientz | 148—14 |
| 2,644,775 | 7/1953 | Spence | 148—14 |
| 3,265,600 | 8/1966 | Carter et al. | 148—27 |

RICHARD O. DEAN, Primary Examiner

U.S. Cl. X.R.

148—13.1, 18, 20.6, 27, 28